June 30, 1931.     H. B. STUART     1,812,569

FRONT WHEEL DRIVE

Filed June 7, 1929

INVENTOR

Homer B. Stuart,

BY

ATTORNEYS

Patented June 30, 1931

1,812,569

UNITED STATES PATENT OFFICE

HOMER B. STUART, OF DETROIT, MICHIGAN

FRONT WHEEL DRIVE

Application filed June 7, 1929. Serial No. 369,187.

The present invention pertains to a novel front wheel drive mechanism for vehicles, particularly referring to automobiles, trucks and such vehicles.

The primary object of the present invention is to devise a mechanism for increasing the applied tractive effort by propelling a motor vehicle through the front wheels as well as through the rear wheels.

Another object of the present invention is to devise a front wheel drive for an automobile or like vehicle which facilitates the application of the motive power to the steering wheels. The steering wheels although serving as driving wheels are capable of pivoting to change the direction of travel of the vehicle, and serve as efficiently as if they were not used for driving wheels. The entire mechanism is completely enclosed to prevent dust or dirt from hindering the operation thereof and to permit satisfactory lubrication thereof.

With the above and other ends in view, the present invention consists in the matters hereinafter set forth and more particularly pointed out in the appended claims, reference being had to the accompanying drawings, in which Figure 1 is a cross sectional plan of the present front wheel drive mechanism;

Figure 4 is a plan view of the housing illustrating the slot formed therein to permit the asembly of the steering knuckle in the housing.

Like characters are employed throughout to designate the corresponding parts.

Figure 1:
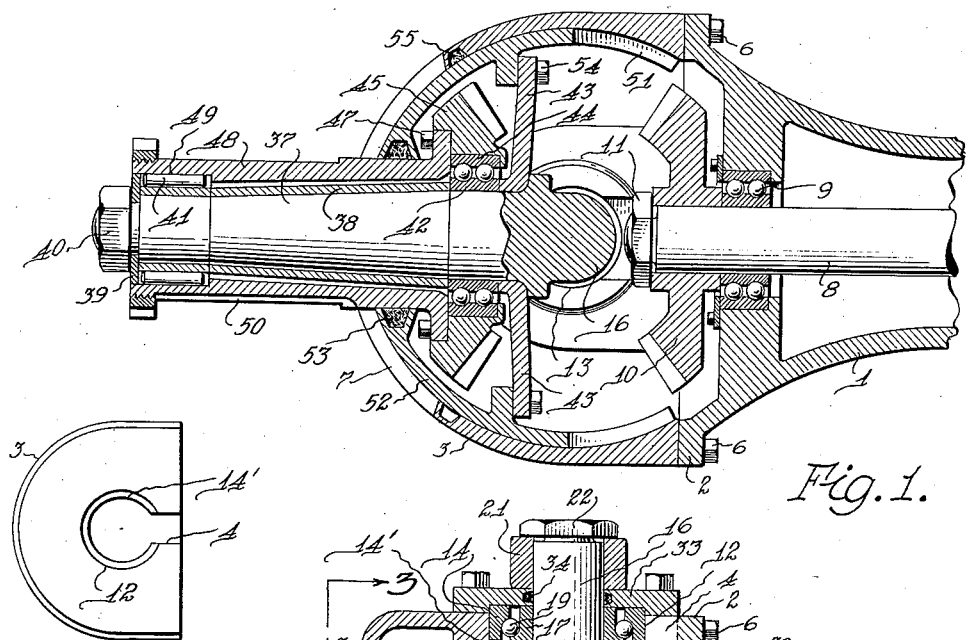
Figure 2:
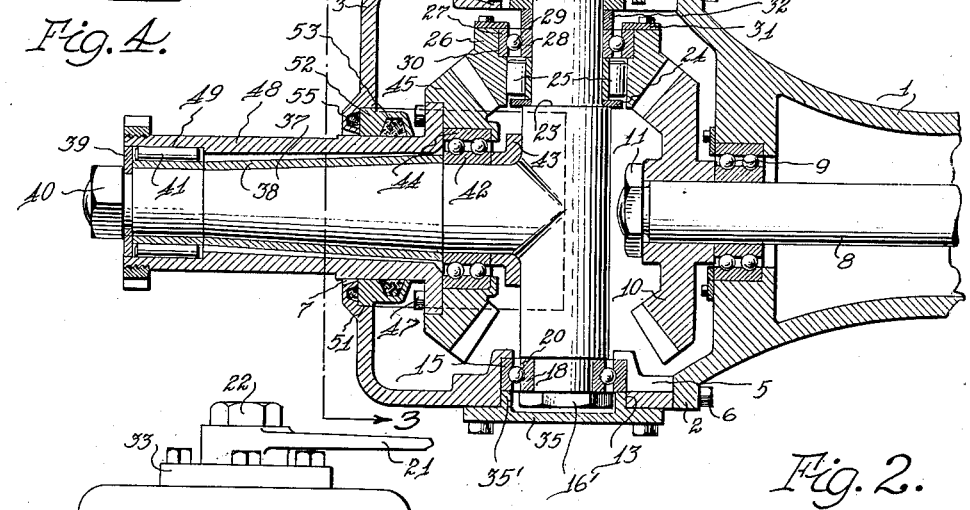
Figure 2 is a cross sectional side elevation.
Figure 3:
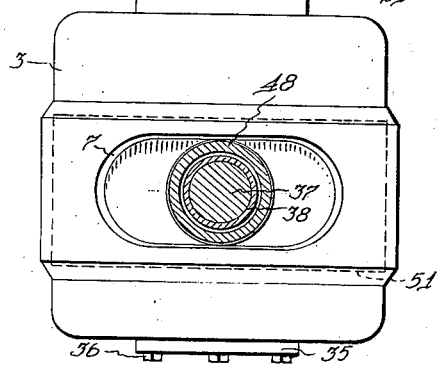
Figure 3 is a cross sectional view on the line 3—3 of Figure 2, illustrating the enclosing casing in elevation.

The numeral 1 indicates the front axle housing of a motor vehicle which is hollow and enlarged at its outer end, this enlarged end being provided with a flange 2. A substantially semi-circular housing 3 is secured to the flange 2 by means of the bolts 6. The outer face of the housing 3 is provided with an opening 7 for a purpose which will become apparent as the description progresses. A driven shaft 8 extends through the hollow axle 1 and has the inner end in connection with the automobile or truck motor through suitable power transmission gearing, the outer end which extends into the housing 3 being suitably supported in the bearings 9. A beveled gear 10 is keyed to the portion of the shaft 8 which extends into the housing 3, the gear being held in position by a nut 11.

The upper and lower walls of the housing 3 are provided with circular openings 12 and 13 respectively in which are mounted the outer ball races 14 and 15 respectively, these openings being provided for the purpose of supporting the steering knuckle 16 and forming a shoulder 14' which supports the ball race 14. The upper opening 12 is provided with a slot 4 and the lower opening 13 is connected to a groove 5, the slot 4 and groove 5 permitting the steering knuckle to be inserted in the casing 3. The steering knuckle has mounted thereon the inner ball races 17 and 18 corresponding respectively with the outer races 14 and 15 and between these corresponding races are mounted the balls 19 and 20. Upon the upper end of the steering knuckle 16 is keyed a lever 21, secured in place by a nut 22, the outer end of the lever 21 being adapted for connection to a reach rod extending from the motor vehicle steering mechanism. A nut 16' is screwthreaded upon the lower end of the steering knuckle for the purpose of retaining the inner race 18 in its proper position.

The steering knuckle 16 is provided with a shoulder 23 which supports a washer 24 for the purpose of supporting the roller bearings 25 in contact with a ring 25' surrounding the knuckle, and in contact with a beveled gear 26 which surrounds the knuckle and which meshes with the beveled gear 10 mounted on the shaft 8. The rollers 25 are held from longitudinal movement in the opposite direction by the outer ball race 27 and an inner ball race 28 between which are mounted the ball bearings 29. The outer race is secured in a recess 30 formed in the beveled gear by a perforated disk 31 and the inner race 28 is held in position by a spacer ring 32 surrounding the steering knuckle which also serves to support the inner ball race 17. The circular opening 12 and the slot 4 are closed by a ring 33 which fits around the upper projecting end of the steering knuckle which is provided with packing 34. The opening 13 is sealed by a plate 35 which is held tightly in place by bolts 36, the plate having a bearing 35' formed extending upwardly thereon to support the ball race 15.

A spindle 37 is formed on the knuckle 16 and projects outwardly through the opening 7 in the housing 3 and upon the spindle the wheel of the motor vehicle is to be mounted. Surrounding the spindle 37 is mounted a spacer sleeve 38 which is held from longitudinal movement by a washer 39 and a nut 40, the outer end providing a race for the roller bearing 41. The inner end of the sleeve retains the ball race 42 in position surrounding the spindle 37, the ball race being retained on the other side by a plate 43 which has a central opening so that it may be placed over the spindle 37. Opposite the ball race 42 is mounted a ball race 44 in a beveled gear 45 which meshes with the beveled gear 26 on the steering knuckle, there being a series of ball bearings 46. Secured to the beveled gear 45 by bolts 47 is an auxiliary spindle 48 having a portion 49 receiving the roller bearings 41, and also having a key groove 50 for securing the motor vehicle wheel thereto.

A groove 51 is formed in the housing 3 and in this groove is mounted a semi-circular sealing plate 52 which is packed around the auxiliary spindle 48 as indicated by the numeral 53. The sealing plate 52 is secured to the plate 43 by means of bolts 54 which thus secures the sealing plate to the spindles 37 and 48. Packing 55 is provided surrounding the opening 7 to prevent oil from passing out through the opening which is covered by the sealing plate 52.

In steering the motor vehicle the steering knuckle is turned by means of the lever 21 which rotates the steering knuckle 16 causing the spindle 37 and the parts carried thereon to swing in an arc. The sealing plate 52 is formed concentric with the housing 3 and when the spindle swings in an arc the sealing plate swings in the groove 51 and thereby seals the opening 7 to prevent the oil which is contained in the housing 3 to escape therethrough.

Rotation of the beveled gear 10 by means of the shaft 8 causes the beveled gear 26 on the steering knuckle 16 to also be rotated, the manner in which the bearings are mounted in the gear 26 permitting the steering knuckle to be turned freely without being affected by rotation of the gear 26. Rotation of the gear 26 imparts rotation to the gear 45 which imparts rotation to the auxiliary spindle 48 and which rotates the motor vehicle wheel (not shown) which is keyed thereto.

Although specific embodiments of my invention have been illustrated and described, it will be understood that changes may be made within the scope of the appended claims without departing from the spirit of the invention and such changes are contemplated.

What I claim is:

1. A front wheel drive mechanism comprising a semi-circular housing having counter-sunk circular openings formed in the top and bottom walls thereof, a slot formed in the upper wall of said housing and opening into said circular opening, a steering knuckle having its ends projecting into said circular openings, bearing members mounted in the counter-sunk portions of said circular openings and supporting said steering knuckle, a nut mounted upon a screwthreaded portion on the lower end of said steering knuckle and butting against the bearing member received in the counter-sunk opening in the lower wall of said housing whereby upward movement of said spindle is prevented, a cover plate secured to the outer face of the lower wall of said housing to cover said circular opening therein, a cover plate mounted upon the upper wall of said housing and having a circular opening therein permitting the upper end of the steering knuckle to project therethrough, a nut mounted upon the upper end of said steering knuckle and adapted to prevent downward movement thereof by reason of the cover plate on the top wall of said housing, and a spindle formed on said steering knuckle and adapted to project through an elongated opening in the front vertical wall thereof.

2. A front wheel drive mechanism comprising a semi-circular housing having counter-sunk circular openings formed in the top and bottom walls thereof, a slot formed in the upper wall of said housing and opening into said circular opening, a steering knuckle having its ends projecting into said circular openings, bearing members mounted in the counter-sunk portions of said circular openings and supporting said steering knuckle, a nut mounted upon a screwthreaded portion on the lower end of said steering knuckle and butting against the bearing member received in the counter-sunk opening in the lower wall of said housing whereby upward movement of said spindle is prevented, a cover plate secured to the outer face of the lower wall of said housing to cover said circular opening therein, a cover plate mounted upon the upper wall of said housing and having a circular opening therein permitting the upper end of the steering knuckle to project therethrough, a nut mounted upon the upper end of said steering knuckle and adapted to prevent downward movement thereof by reason of the cover plate on the top wall of said housing, a spindle mounted on said steering knuckle, an auxiliary spindle mounted on said first named spindle, both of said spindles being adapted to project through an elongated opening in the front vertical wall of said housing, a sealing plate mounted on said auxiliary spindle and received in a groove formed in the inner face of the vertical wall of said housing, and a train of beveled gears mounted in said housing for rotating said auxiliary spindle.

In testimony whereof I affix my signature.

HOMER B. STUART.